(12) United States Patent
Horng et al.

(10) Patent No.: US 6,750,586 B2
(45) Date of Patent: Jun. 15, 2004

(54) DC BRUSHLESS MOTOR STRUCTURE

(75) Inventors: Alex Horng, Kaohsiung (TW); Ching-Shen Hong, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 252 days.

(21) Appl. No.: 09/964,342

(22) Filed: Sep. 28, 2001

(65) Prior Publication Data

US 2003/0062793 A1 Apr. 3, 2003

(51) Int. Cl.$^7$ .................................................. H02K 21/12
(52) U.S. Cl. .................. 310/256; 310/156.05; 310/256; 318/133
(58) Field of Search ........................... 310/156.06, 254; 318/133

(56) References Cited

U.S. PATENT DOCUMENTS 5,075,605 A * 12/1991 Hedricks .................... 318/133
6,565,326 B2 * 5/2003 Horng ........................ 417/44.1

* cited by examiner

Primary Examiner—Thomas M. Dougherty
Assistant Examiner—Iraj A. Mohandesi
(74) Attorney, Agent, or Firm—Bacon & Thomas, PLLC

(57) ABSTRACT

A DC brushless motor structure comprises a cylinder-like base having a through-hole or a chamber. The through-hole acts as an axle hole for rotatably receiving a shaft of a rotor. Alternatively, the shaft of the rotor is rotatably received in the chamber. An axle hole is defined in an end of the base. Another axle hole is defined in a lid attached to an end of the base. The shaft of the rotor is rotatably received in the axle holes. At least two sets of windings are mounted to the base. Also mounted to the base is an IC control member electrically connected to the windings. A magnetic force is generated by a magnetic field that is created as a result of energizing the windings to thereby repulse the permanent magnet of the rotor having a north pole and a south pole, thereby driving the rotor to turn.

8 Claims, 8 Drawing Sheets

DC BRUSHLESS MOTOR STRUCTURE

BACKGROUND OF THE INVENTION

1. Field of the Invention

The present invention relates to a DC brushless motor structure that is comprised of fewer members, is easy to process and assemble, and is reduced to a minimized volume.

2. Description of the Related Art

FIG. 12 of the drawings illustrates a conventional DC brushless motor structure comprising a stator bobbin 90 having upper and lower pole plates 91 and 92 respectively mounted to an upper end and a lower end thereof. A metal axle tube 93 extends through the upper and lower pole plates 91 and 92, the stator bobbin 90, and a circuit board 94. A bearing 95 is mounted in the metal axle tube 93 for rotatably holding a shaft 97 of a rotor 96. A permanent magnet 98 is mounted to the rotor 96 and comprises a north pole and a south pole that cooperate with a magnetic force created in the edge of the upper and lower pole plates 91 and 92 for generating a repulsive force, thereby driving the rotor 96 to turn.

FIG. 13 of the drawings illustrates another conventional DC brushless motor structure comprising a stator 80 comprised of plural laminated silicon steel plates. Windings 82 are wound around the pole arms 81 of the stator 80. Engaged in a central portion of the stator 80 is an axle tube 83 that extends through a circuit board 84. A bearing 85 is mounted in the axle tube 83 for rotatably receiving a shaft 87 of a rotor 86. A permanent magnet 88 is mounted to the rotor 86 and comprises a north pole and a south pole that cooperate with a magnetic force created between the pole arms 81 for generating a repulsive force, thereby driving the rotor 86 to turn.

In these conventional DC brushless motor structure, since the upper and lower pole plates 91 and 92 and the metal axle tube 93 are used to create a magnetically conductive path for driving the rotor 96, 86, the overall volume of the motor structures cannot be effectively reduced. In addition, since the repulsive magnetic force created between the upper and lower pole plates 91 and 92 and the permanent magnet 98, 88 for turning the rotor 96, 86 requires a magnetically conductive path created by the upper and lower pole plates 91 and 92 and the metal axle tube 93, an increase in the overall magnetic resistance is caused, as magnetic resistance exists in the materials for these elements. The rotational torque is adversely affected accordingly.

SUMMARY OF THE INVENTION

It is an object of the present invention to provide a DC brushless motor structure that is comprised of fewer members and is thus easy to process and assemble.

Another object of the present invention is to provide a DC brushless motor structure that is reduced to a minimized volume to thereby have a wider application.

A further object of the present invention is to provide a DC brushless motor structure in which a mutual repulsive force is created between a magnetic field created as a result of energizing windings and a permanent magnet having a north pole and a south pole without the need of creating a magnetically conductive path by any magnetically conductive elements. Thus, the magnetic resistance is reduced to the minimum and the DC brushless motor has an improved rotational torque.

A DC brushless motor structure in accordance with the present invention comprises a cylinder-like base having a through-hole or a chamber. The through-hole acts as an axle hole for rotatably receiving a shaft of a rotor. Alternatively, the shaft of the rotor is rotatably received in the chamber. An axle hole is defined in an end of the base. Another axle hole is defined in a lid attached to an end of the base. The shaft of the rotor is rotatably received in the axle holes. At least two sets of windings are mounted to the base. Also mounted to the base is an IC control member that is electrically connected to the windings. A magnetic force is generated by a magnetic field that is created as a result of energizing the windings to thereby repulse the permanent magnet of the rotor having a north pole and a south pole, thereby driving the rotor to turn.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
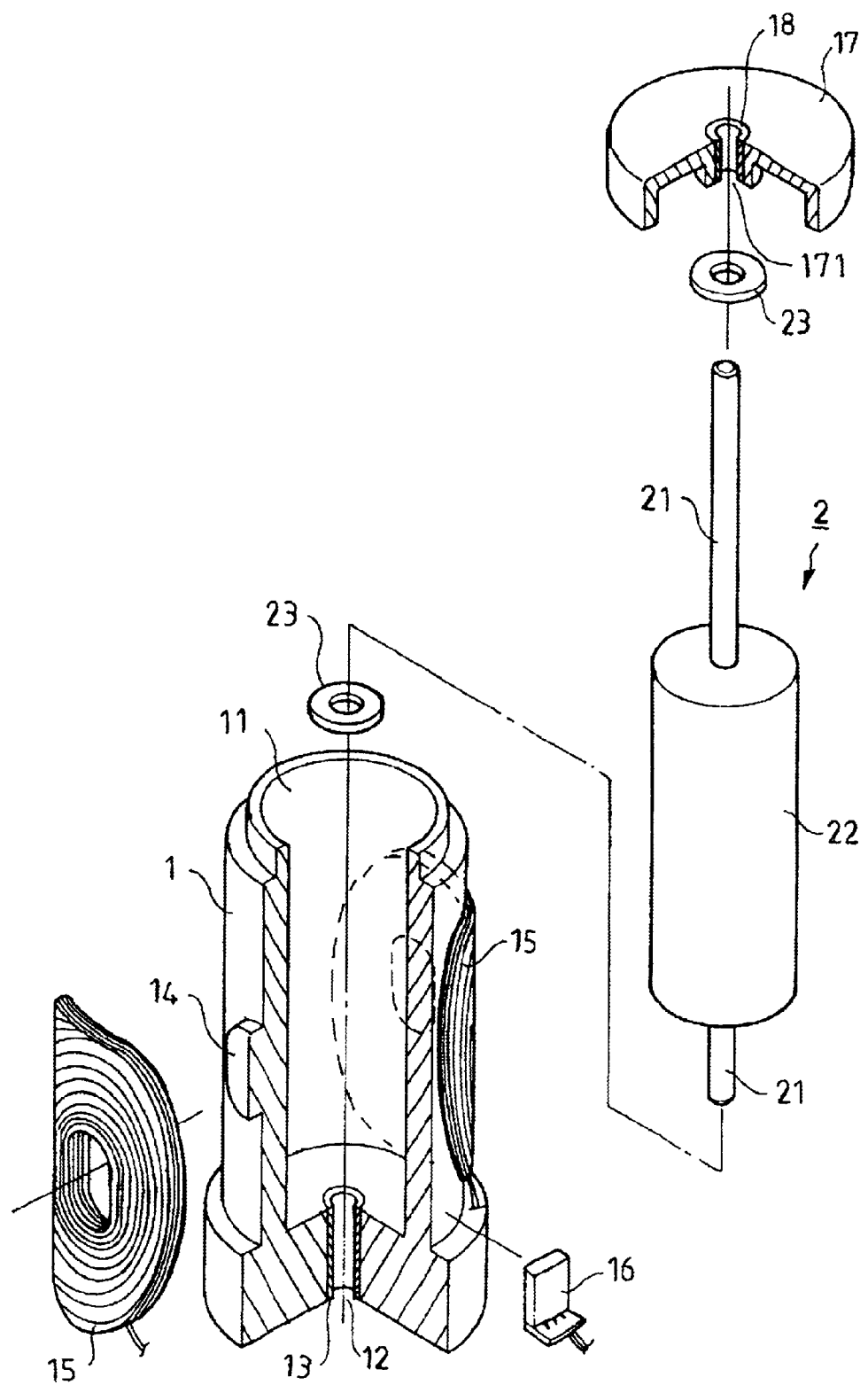
FIG. 1 is an exploded perspective view of a first embodiment of a DC brushless motor structure in accordance with the present invention.

Referring to FIG. 1, a first embodiment of a DC brushless motor structure in accordance with the present invention generally comprises a base 1 and a rotor 2.

The base 1 is a cylinder having a chamber 11 with an open end for rotatably receiving the rotor 2, and a lid 17 is provided to enclose the chamber 11. An axle hole 12 is defined in the other end of the chamber 11. In this preferred embodiment, an abrasion-resistant member such as a bearing 13 or shaft sleeve is mounted in the axle hole 12 for rotatably receiving an end of a shaft 21 of the rotor 2. At least two mounting members 14 are provided on a wall of the vase 1. Each mounting member 14 may be a countersink in the base 1 or an outwardly projecting peg shown in FIG. 1, and an associated winding 15 is engaged on the peg 14. In order to allow the rotor 2 to turn, an IC control means 16 comprising a conventional drive circuit and a Hall element is mounted on the base 1 and electrically connected to the windings 15. The lid 17 has an axle hole 171. In a preferred embodiment, an abrasion-resistant member such as a bearing 18 or shaft sleeve is mounted in the axle hole 12 for rotatably receiving an end of a shaft 21 of the rotor 2.

The shaft 21 of the rotor 2 has a permanent magnet 22 mounted therearound, the permanent magnet 22 having a north pole and a south pole. Two ends of the shaft 21 are respectively, rotatably received in the axle hole 12 of the base 1 and the axle hole 171 of the lid 17. If necessary, two washers 23 are mounted on the shaft of the rotor and respectively located on two ends of the permanent magnet 22 to avoid direct friction between the permanent magnet 22 and the base 1 and avoid direct friction between the permanent magnet 22 and the lid 17. An end of the shaft 21 may extend out of the base 1 via the axle hole 12 of the base 1 or the axle hole 171 of the lid 17.

Figure 2:
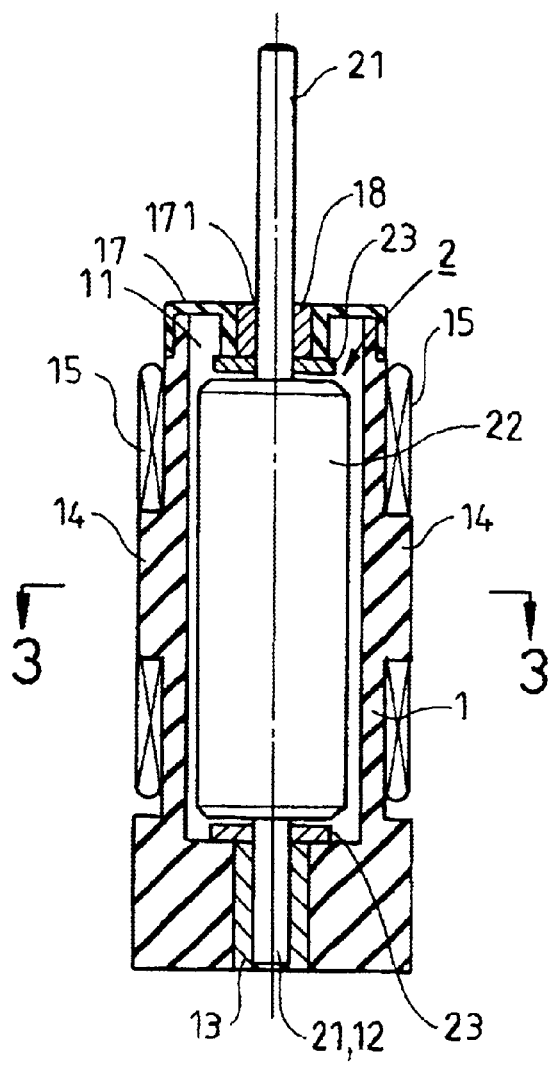
FIG. 2 is a sectional view of the DC brushless motor structure in FIG. 1.
Figure 3:
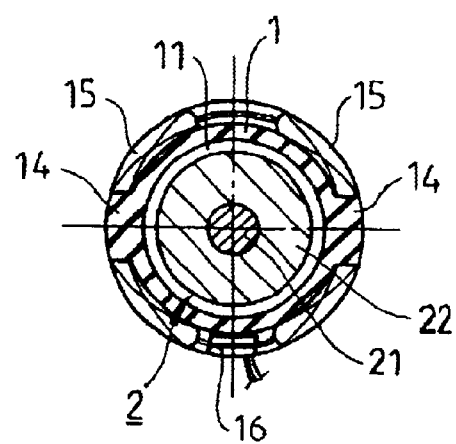
FIG. 3 is a sectional view taken along line 3—3 in FIG. 2.

As illustrated in FIGS. 2 and 3, the base 1 has two mounting members 14 formed on the wall thereof for respectively engaging with two sets of windings 15. The rotor 2 is received in the chamber 11 of the base 1, and the lid 17 is engaged to the open end of the chamber 11 of the base 1. Two ends of the shaft 21 of the rotor 2 are respectively, rotatably received in the axle hole 12 of the base 1 and the axle hole 171 of the lid 17. The IC control means 16 detects a change in the polarity of the permanent magnet 22 of the rotor 2 and sends a signal to alter the polarity of the magnetic field created by the sets of windings 15, thereby driving the permanent magnet 22 to turn by a repulsive force and thereby allowing continuous rotation of the rotor 2.

Figure 4:
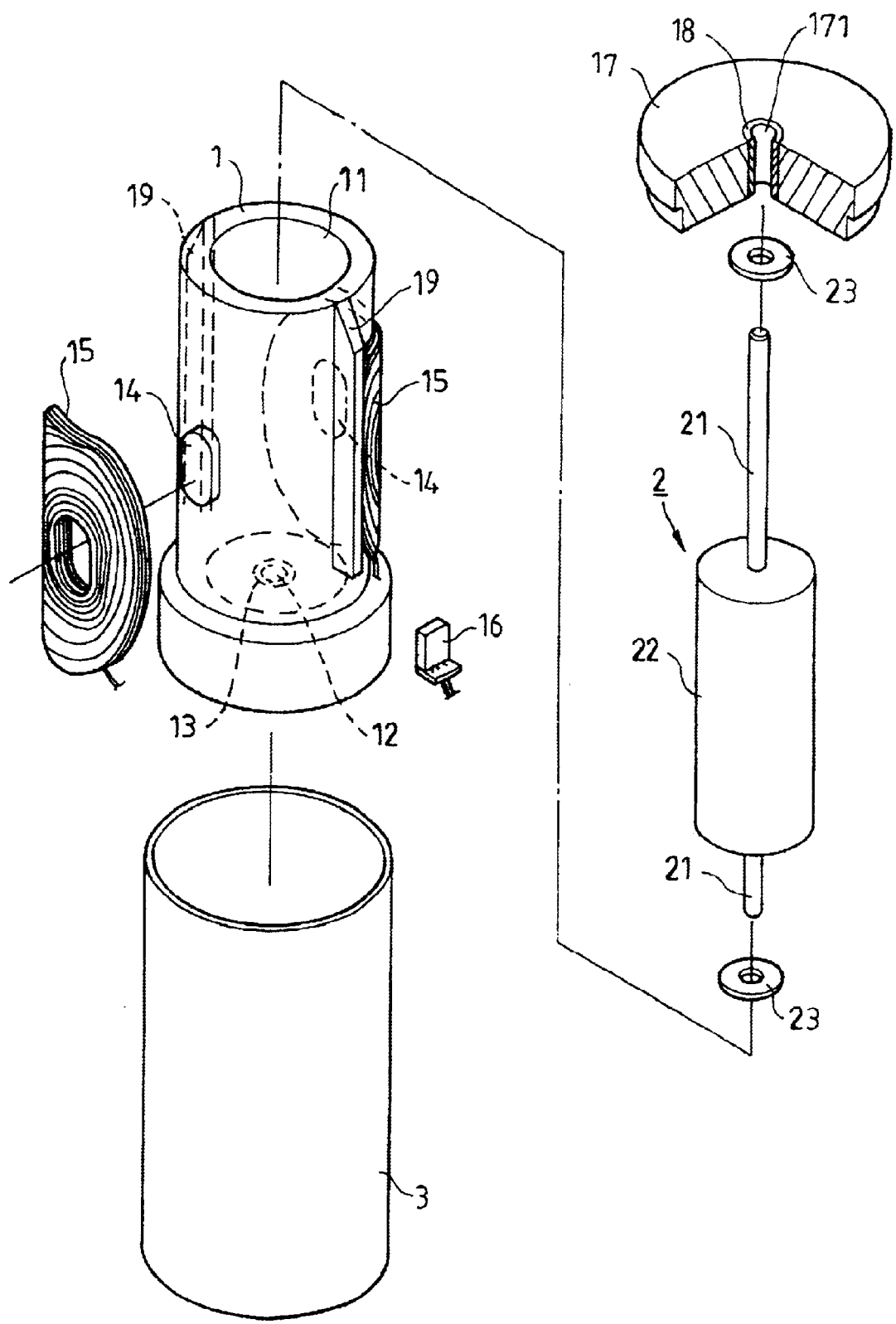
FIG. 4 is an exploded perspective view of a second embodiment of the DC brushless motor structure in accordance with the present invention.
Figure 5:
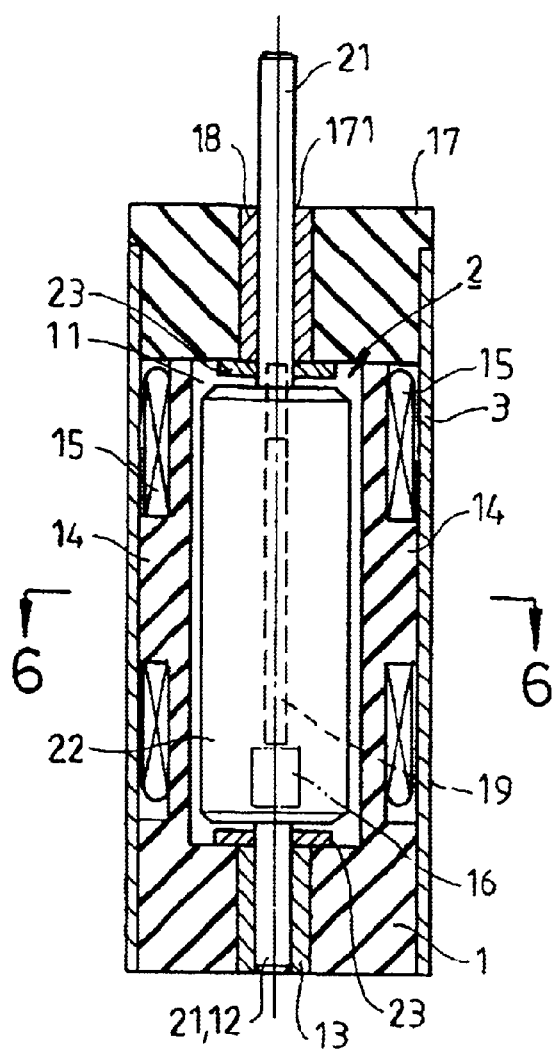
FIG. 5 is a sectional view of the DC brushless motor structure in FIG. 4.
Figure 6:
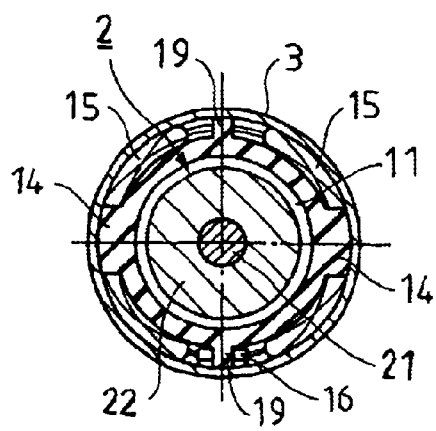
FIG. 6 is a sectional view taken along line 6—6 in FIG. 5.

FIG. 4 illustrates a second embodiment of the invention, wherein the wall of the base 1 comprises at least one rib 19 on an outer face thereof, and at least two mounting members 14 are provided on the wall of the base 1 for mounting at least two sets of windings 15. An IC control means 16 is mounted on the base 1 and a casing 3 is provided to enclose the elements. Further, a lid 17 is provided to enclose an open end of the casing 3, best shown in FIGS. 5 and 6. Thus, the two sets of windings 15 and the IC control means 16 can be protected by the casing 3.

Figure 7:
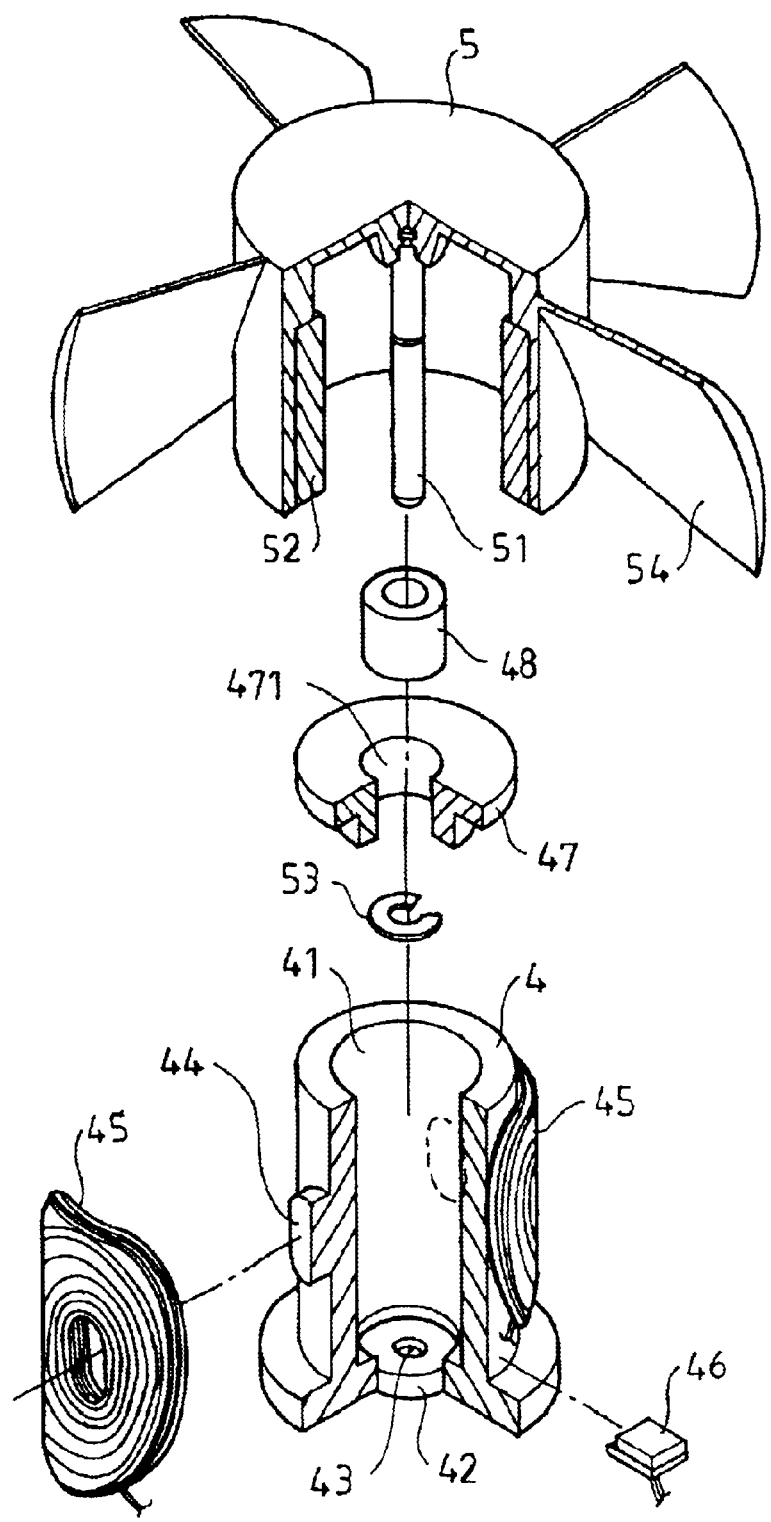
FIG. 7 is an exploded perspective view of a third embodiment of the DC brushless motor structure in accordance with the present invention.

FIG. 7 illustrates a third embodiment of the invention comprising a base 4 and a rotor 5.

The base 4 has a through-hole 41 that acts as an axle hole for rotatably receiving a shaft 51 of the rotor 5. In a preferred embodiment, the through-hole 41 has an inner diameter greater than an outer diameter of the shaft 51. In addition, a lid 47 is mounted to an end of the through-hole 41 and has an axle hole 471 for rotatably holding the shaft 51. In a preferred embodiment, an abrasion-resistant member such as a bearing 48 or shaft sleeve is mounted in the axle hole 471. The other end of the base 4 provides a support for an end of the shaft 51. In a preferred embodiment, a support member 42 made of abrasion-resistant material is provided on the other end of the base 4 and has a concave arcuate recess 43 for providing a more stable fixed-point rotation for the rotor 5. At least two mounting members 44 are provided on a wall of the base 4 for mounting a corresponding number of sets of windings 45. An IC control means 46 is mounted to the base 4 and comprises a drive circuit and a Hall element. The IC control means 46 is electrically connected to the windings 45.

An end of the shaft 51 of the rotor 5 extends through the axle hole 471 of the lid 47 and the bearing 48. The other end of the shaft 51 rests on the support member 42 or in the arcuate recess 43 in the support member 42 to provide the rotor 5 with a more stable rotation. A permanent ring magnet 52 is mounted to the rotor 5 and has a north pole and a south pole. The permanent ring magnet 52 surrounds the base 4. If necessary, blades 54 may be formed on the rotor 5 such that air current is driven when the rotor 5 turns, thereby forming a heat-dissipating fan.

Figure 8:
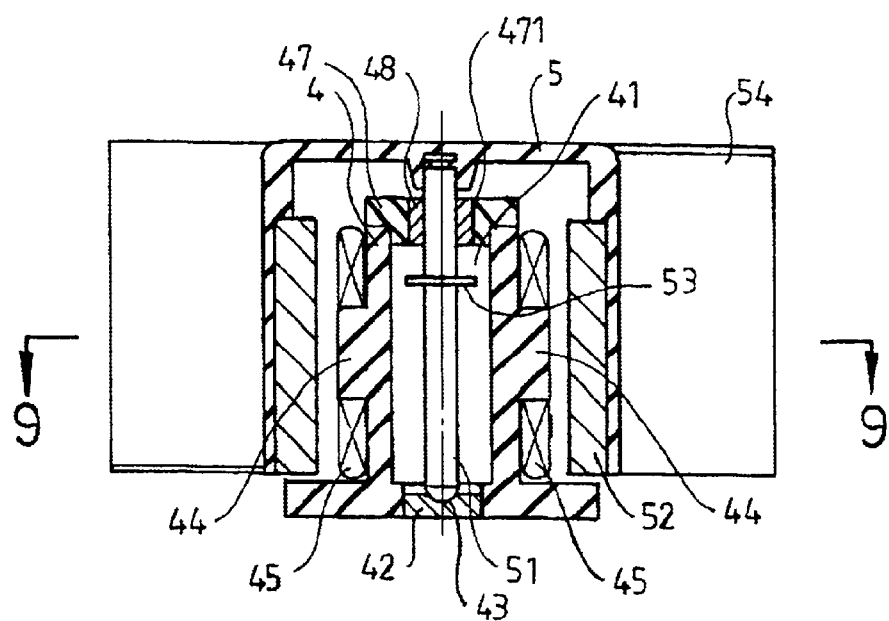
FIG. 8 is a sectional view of the DC brushless motor structure in FIG. 7.
Figure 9:
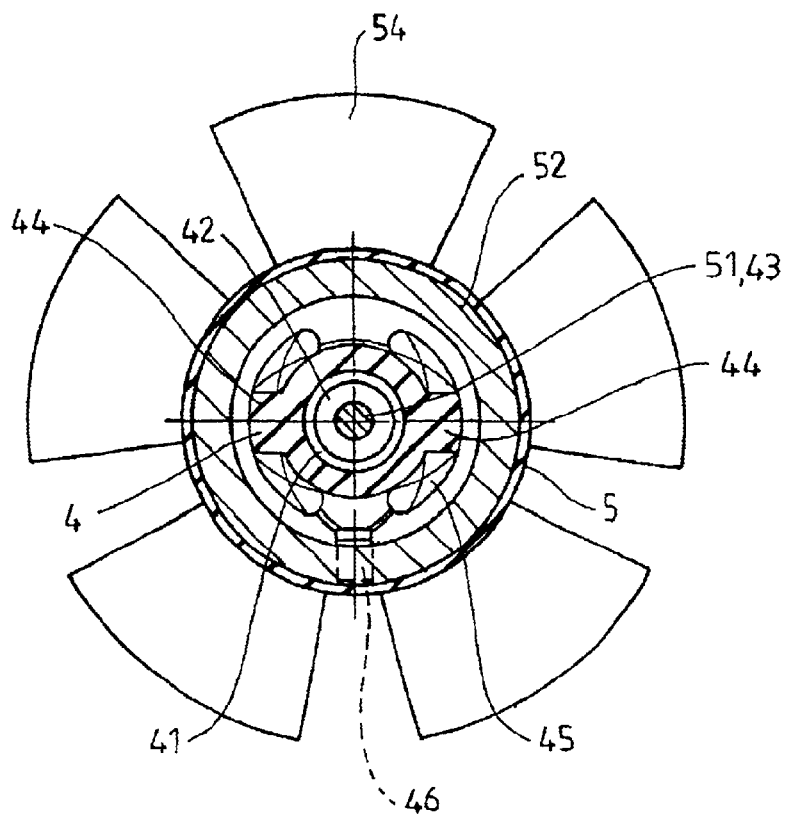
FIG. 9 is a sectional view taken along line 9—9 in FIG. 8.

As illustrated in FIGS. 8 and 9, the end of the shaft 51 of the rotor 5 extends through the axle hole 471 of the lid 47 and the bearing 48 and is then retained in place by a retainer 53 such as a C-clip. The other end of the shaft 51 rests on the support member 42 or in the arcuate recess 43 in the support member 42 to provide the rotor 5 with a more stable rotation. The permanent ring magnet 52 of the rotor 5 surrounds the base 4 and is located in a position corresponding to the positions of the windings 45. Thus, a repulsive force is created between the permanent magnet 52 having a north pole and a south pole and a magnetic field created as a result of energizing the windings 45. And the rotor 5 is turned by the repulsive force.

Figure 11:
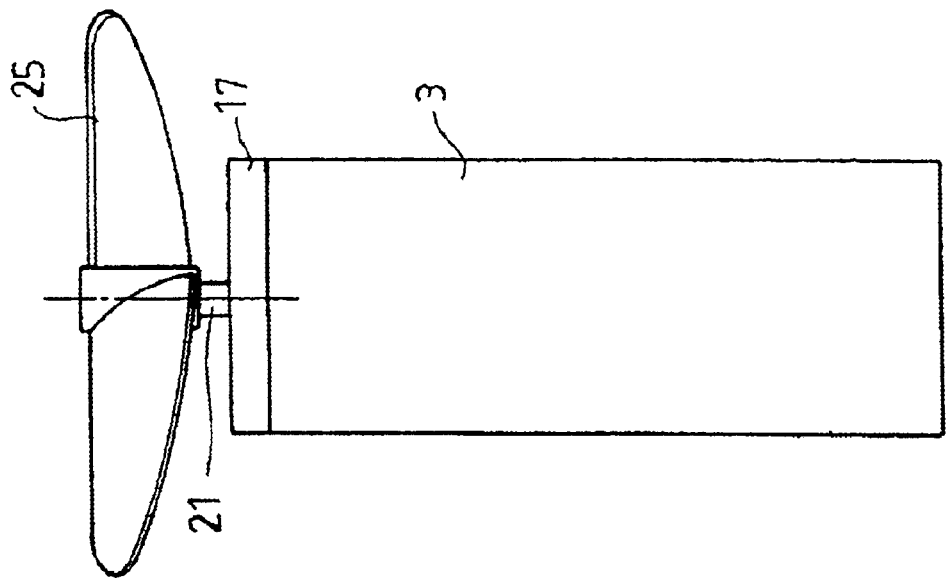
FIG. 11 is a side view of a heat-dissipating fan using the DC brushless motor structure in accordance with the present invention.
Figure 10:
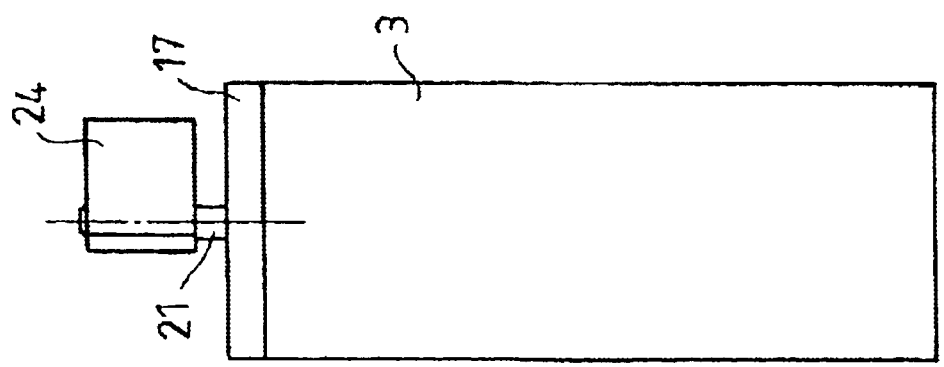
FIG. 10 is a side view of a vibratory motor using the DC brushless motor structure in accordance with the present invention.
Figure 12:
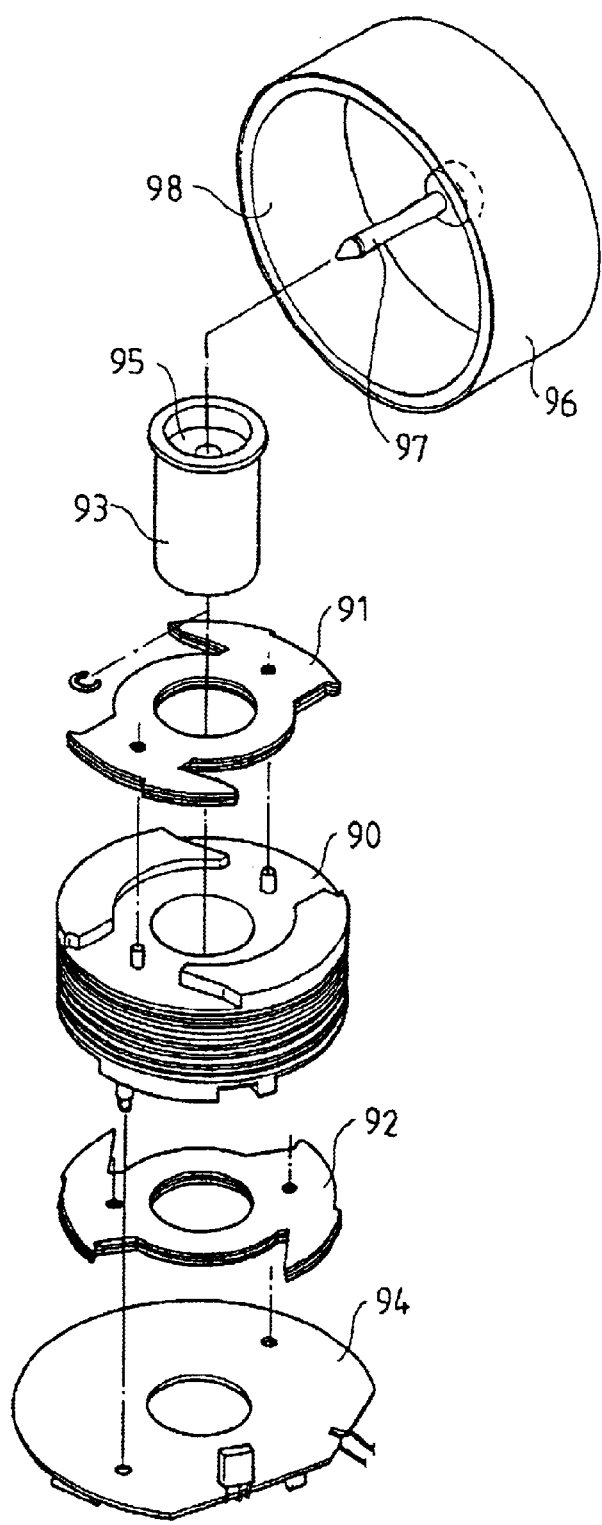
FIG. 12 is an exploded perspective view of a conventional DC brushless motor structure.

Referring to FIG. 10, after assembly of the DC brushless motor, an eccentric element 24 may be coupled to the shaft 21 extending beyond the lid 17 or the base 1, thereby using the DC brushless motor as a vibratory motor. Alternatively, as illustrated in FIG. 11, a fan wheel 25 may be coupled to the shaft 21 extending beyond the lid 17 or the base 1, thereby using the DC brushless motor as a heat-dissipating fan.

The DC brushless motor structure in accordance with the present invention has fewer elements and thus has a simplified structure that is easy to manufacture and process. In addition, the magnetically conductive elements such as the pole plates and the metal axle tube required in conventional DC brushless motors are omitted in the DC brushless motor structure in accordance with the present invention. The overall volume of the DC brushless motor structure in accordance with the present invention is reduced. Further, since the repulsive magnetic force for turning the rotor is directly created between a magnetic field created as a result of energizing the windings and the permanent magnet of the rotor, the magnetically conductive path is largely shortened. As a result, the magnetic resistance is reduced to thereby provide the rotor with a greater rotational torque.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A DC brushless motor structure comprising:

a base comprising a through-hole and a wall, at least two sets of windings being mounted to the wall of the base, an IC control means being mounted on the base and electrically connected to said at least two sets of windings; and a rotor comprising a shaft and a permanent magnet having a north pole and a south pole, the shaft being rotatably received in the through-hole of the base, the permanent magnet surrounding the base, a repulsive magnetic force is directly created between the permanent magnet and said at least two sets of windings, thereby driving the rotor to turn, wherein the through-hole of the base has an inner diameter greater than an outer diameter of the shaft of the rotor, the through-hole has a first end and a second end, a support member being mounted in the first end of the through-hole, a lid being engaged with the second end of the through-hole and having an axle hole through which an end of the shaft extends, the supporting member supporting another end of the shaft.

2. The DC brushless motor structure as claimed in claim 1, wherein the support member has an arcuate recess for supporting said another end of the shaft.

3. The DC brushless motor structure as claimed in claim 1, wherein the axle hole of the lid has a bearing mounted therein for rotatably holding the shaft.

4. The DC brushless motor structure as claimed in claim 1, wherein the wall of the base has at least two mounting members for mounting said at least two sets of windings.

5. The DC brushless motor structure as claimed in claim 4, wherein each of the mounting members is a countersink.

6. The DC brushless motor structure as claimed in claim 4, wherein each of the mounting members is an outwardly projecting peg.

7. The DC brushless motor structure as claimed in claim 1, wherein the IC control means comprises a driving circuit and a Hall element.

8. The DC brushless motor structure as claimed in claim 1, wherein the rotor has plural blades mounted thereon.

* * * * *